US010674395B2

(12) United States Patent
Mukherjee et al.

(10) Patent No.: US 10,674,395 B2
(45) Date of Patent: Jun. 2, 2020

(54) METHOD AND SYSTEM FOR RAN-AWARE MULTI-ACCESS EDGE COMPUTING TRAFFIC CONTROL

(71) Applicant: Verizon Patent and Licensing Inc., Arlington, VA (US)

(72) Inventors: Amitav Mukherjee, Elk Grove, CA (US); Fred Weisbrod, Renton, WA (US); Patricia R. Chang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 39 days.

(21) Appl. No.: 16/018,525

(22) Filed: Jun. 26, 2018

(65) Prior Publication Data

US 2019/0394672 A1 Dec. 26, 2019

(51) Int. Cl.
*H04W 28/02* (2009.01)
*H04L 12/801* (2013.01)
*H04W 28/08* (2009.01)
*H04W 28/10* (2009.01)
*H04L 12/813* (2013.01)

(52) U.S. Cl.
CPC ......... *H04W 28/0289* (2013.01); *H04L 47/11* (2013.01); *H04L 47/14* (2013.01); *H04L 47/20* (2013.01); *H04W 28/08* (2013.01); *H04W 28/10* (2013.01)

(58) Field of Classification Search
CPC ... H04W 28/08; H04W 28/0289; H04L 47/11; H04L 47/14; H04L 47/20
See application file for complete search history.

(56) References Cited

U.S. PATENT DOCUMENTS

| 2011/0044168 A1* | 2/2011 | N Das | H04L 1/0002 370/232 |
| 2015/0382230 A1* | 12/2015 | Miklos | H04W 28/0247 370/230 |
| 2017/0311198 A1* | 10/2017 | Monjas Llorente | H04W 28/08 |

* cited by examiner

*Primary Examiner* — Wei Zhao

(57) ABSTRACT

A method, a device, and a non-transitory storage medium are described in which a traffic control service is provided. The traffic control service may include using user plane congestion information pertaining to a radio access network and a multi-access edge computing system to manage congestion or anticipated congestion.

20 Claims, 15 Drawing Sheets

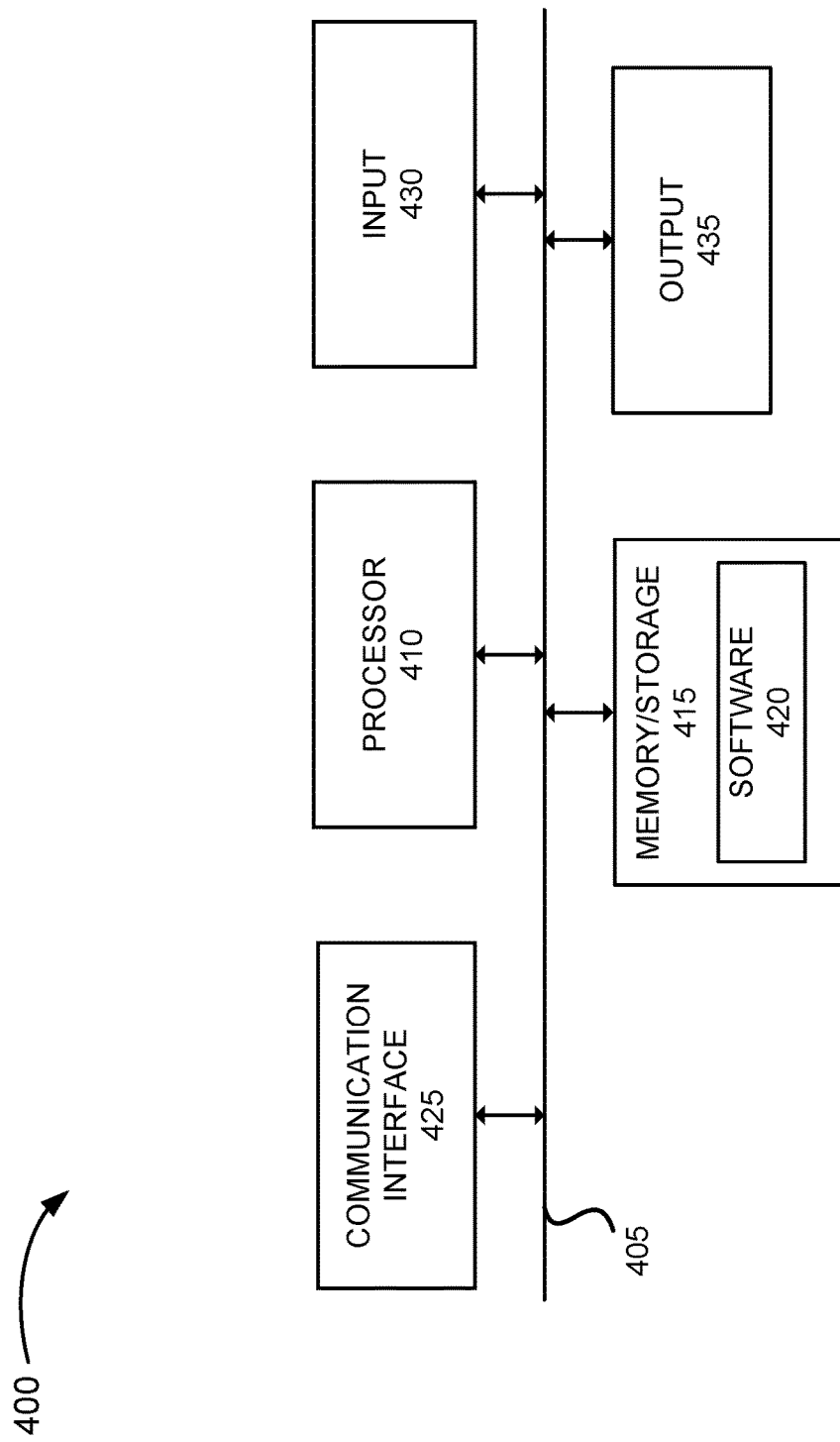

METHOD AND SYSTEM FOR RAN-AWARE MULTI-ACCESS EDGE COMPUTING TRAFFIC CONTROL

BACKGROUND

Development and design of radio access networks (RANs) present certain challenges from a network-side perspective and an end device perspective. In order to enhance performance, multi-access edge computing (MEC) is being explored in which core network capabilities (e.g., computational, storage, etc.) are situated at the network edge in order to reduce traffic being sent to the core network.

BRIEF DESCRIPTION OF THE DRAWINGS

FIG. 4 is a diagram illustrating exemplary components of a device that may correspond to one or more of the devices illustrated and described herein.

DETAILED DESCRIPTION OF PREFERRED EMBODIMENTS

Figure 1A:
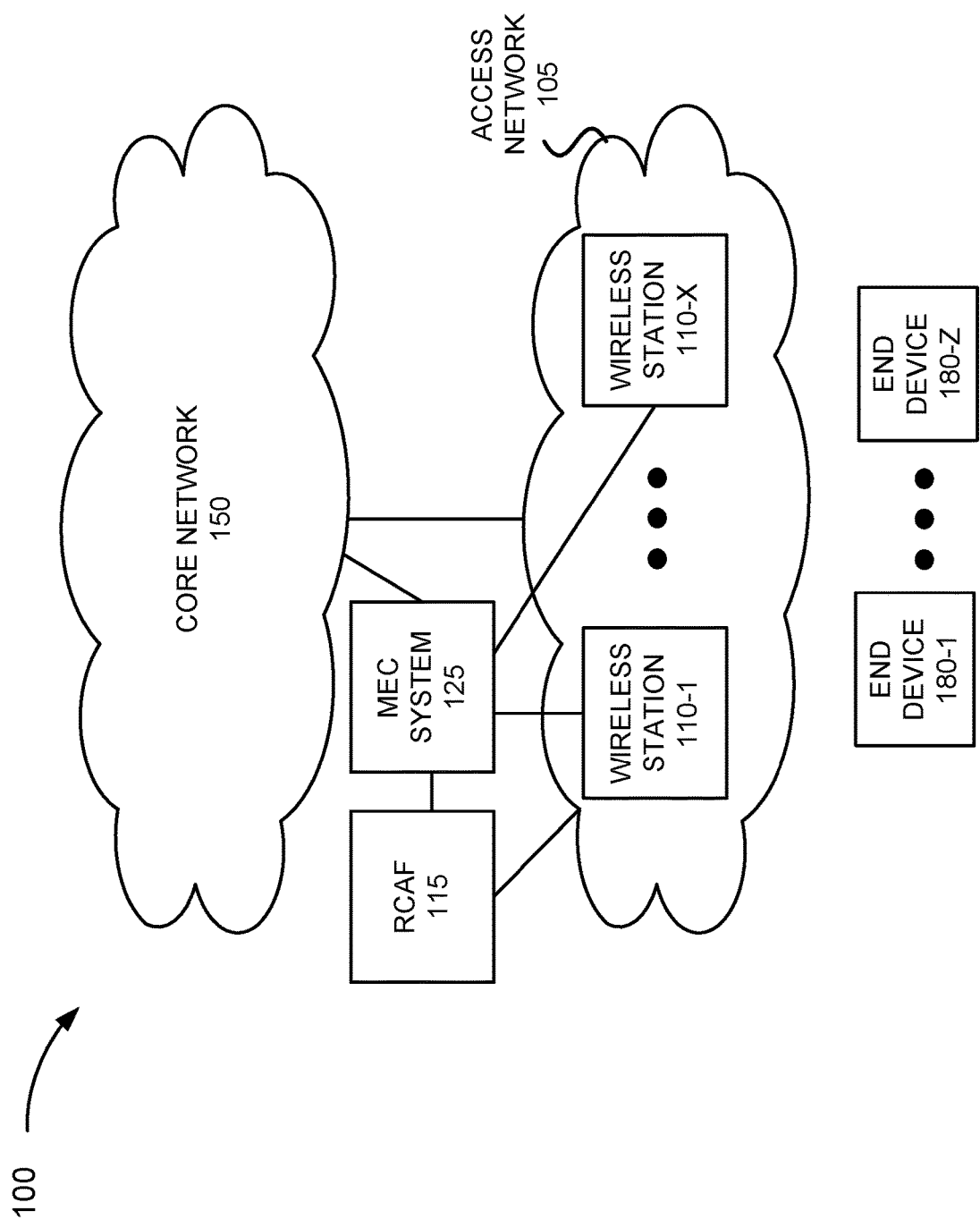
FIG. 1A is a diagram illustrating an exemplary environment in which an exemplary embodiment of a traffic control service may be implemented.

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and so forth. In the design of the wireless network, MEC is being considered. The integration of MEC may reduce the traffic sent to and received from the core network because of the local offload that the MEC provides. However, the traffic between a RAN and the MEC and between the RAN and end devices can be significant. For example, the amount of traffic from Internet of Thing (IoT) devices to the MEC can cause RAN congestion and service disruption for other end devices. Similarly, the amount of traffic from the MEC to end devices via the RAN can cause congestion and service disruption.

According to exemplary embodiments, a traffic control service is provided. According to an exemplary embodiment, the traffic control service provides traffic control in relation to a MEC, a single radio access technology (RAT) environment, and end devices. For example, the single RAT environment may be implemented as a 4G RAT environment, a 4.5G RAT environment, a 5G RAT environment, or another type of wireless environment.

According to another exemplary embodiment, the traffic control service provides traffic control in relation to a MEC, a multi-RAT environment, and end devices. According to some exemplary embodiments, the multi-RAT environment may support multi-connectivity between the multi-RAT network and an end device. For example, the multi-RAT environment may be implemented as an Evolved Universal Radio Access-New Radio (E-UTRA-NR) Dual Connectivity (EN-DC) environment, an NR-E-UTRA-DC (NE-DC) environment, or a Next Generation (NG) radio access network (RAN) E-UTRA-NR DC (NGEN-DC) environment. According to still other exemplary implementations, the traffic control service may be implemented in other types of dual or higher connectivity environments that may include additional and/or different RATs.

According to an exemplary embodiment, a network device of the MEC provides the traffic control service. According to another exemplary embodiment, a network device not of the MEC provides the traffic control service. According to yet other exemplary embodiments, the traffic control service may be implemented based on a combination of network devices in which some are part of the MEC and some are not.

According to an exemplary embodiment, the traffic control service uses RAN User Plane Congestion Information (RUCI) to determine whether congestion is present in the RAN and/or whether congestion is anticipated in the RAN. For example, the RUCI may be obtained from a RAN Congestion Awareness Function (RCAF).

According to other exemplary embodiments, the traffic control service may use other types of information to determine whether congestion is present and/or anticipated. For example, a network device of the MEC (or not of the MEC) may generate information indicating load conditions relative to network devices in the MEC, communication links within the MEC, and/or communication links between the MEC and the RAN (also referred to herein as MEC User Plane Congestion Information (MUCI)). The MUCI may be application-specific or service-specific. The traffic control service may determine whether congestion is present or anticipated based on the MUCI.

According to an exemplary embodiment, in response to determining that congestion is present, the traffic control service may take remedial measures to mitigate the congestion. According to an exemplary implementation, the traffic control service may use traffic shaping policies or another type of configuration as a basis to manage a traffic flow between the MEC and the RAN and/or the traffic flow between the RAN and the end device, as described herein.

According to another exemplary embodiment, in response to determining that congestion is not present, the traffic control service may take remedial measures to mitigate an anticipated congestion. Additionally, or alternatively, according to still another exemplary embodiment, in response to determining that congestion is not present and not anticipated, the traffic control service may continue to monitor the state of the MEC-to-end device communication path.

As a result, the traffic control service may improve network resource utilization in a network. For example, the traffic control service may improve the use of various network resources (e.g., physical, logical, virtual) in relation to network devices of a RAN and/or the MEC based on the management of congestion in the communication path between the MEC and the end device via the RAN, as described herein. Additionally, from an end device perspective, the traffic control service may improve resource utilization at the end device by avoiding the execution of various procedures (e.g., connection release procedures, connection re-establishment procedures, access barring procedures, etc.) due to the presence of congestion in the RAN (or another part of the communication path with the MEC). Also, the traffic control service may improve connectivity and use of network services for the end device.

FIG. 1A is a diagram illustrating an exemplary environment 100 in which an exemplary embodiment of the traffic control service may be implemented. As illustrated, environment 100 includes an access network 105 and a core network 150. Access network 105 may include wireless stations 110-1 through 110-X (referred to collectively as wireless stations 110 and individually (or generally) as wireless station 110). Environment 100 further includes an RCAF 115, a MEC system 125, and end devices 180-1 through 108-Z (referred to collectively as end devices 180 and individually (or generally) as end device 180).

The number, the type, and the arrangement of network devices, and the number of end devices 180 are exemplary. A network device, a network element, or a network function (referred to herein simply as a network device) may be implemented according to one or multiple network architectures (e.g., a client device, a server device, a peer device, a proxy device, a cloud device, a virtualized function, etc).

Environment 100 includes communication links between the networks, between the network devices, and between the network devices and the networks. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1A. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a 4G RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), a future or next generation RAN (e.g., a 5G-access network (5G-AN) or a 5G-RAN (referred to herein as simply a 5G-RAN)), and/or other types of wireless networks, such as a WiFi network, a Worldwide Interoperability for Microwave Access (WiMAX) network, a local area network (LAN), a Bluetooth network, a personal area network (PAN), or another type of network that may be considered a network edge.

According to various exemplary embodiments, access network 105 may be implemented according to various architectures of wireless service, such as, for example, macrocell, microcell, femtocell, picocell, metrocell, noncell, or other configuration. Additionally, according to various exemplary embodiments, access network 105 may be implemented according to various wireless technologies (e.g., radio access technology (RAT), etc.), wireless standards, wireless frequencies/bands, and so forth. Access network 105 may be configured to support a DC service. For example, the DC service may include a secondary cell group (SCG) split bearer service, a master cell group (MCG) split bearer, an SCG bearer service, and so forth.

Depending on the implementation, access network 105 may include one or multiple types of wireless stations 110. For example, wireless station 110 may be implemented as an evolved Node B (eNB), a next generation Node B (gNB), an evolved Long Term Evolution (eLTE) eNB, a radio network controller (RNC), a small cell node (e.g., a picocell device, a femtocell device, a microcell device, a home eNB, etc.)), or another type of wireless node (e.g., a WiFi device, a WiMax device, a hot spot device, etc.) that provides a wireless access service.

RCAF 115 includes logic that detects congestion in access network 105. For example, RCAF 115 may detect whether wireless station 110, a cell of wireless station 110, and/or a sector of wireless station 110 (e.g., a portion of a cell) is congested. RCAF 115 may also include logic that identifies end devices 180 that may be served by a congested wireless station 110, congested cell, or congested sector.

RCAF 115 includes logic that generates the RUCI. According to an exemplary implementation, the RUCI may include congestion level information. For example, the congestion level information may include a congestion value indicating a level of congestion (e.g., no congestion, low congestion, medium congestion, high congestion, or another nomenclature/value indicating a level of congestion) pertaining to wireless station 110, a cell of wireless station 110, and/or a sector of wireless station 110. The RUCI may include an end device identifier of end device 180 (e.g., International Mobile Subscriber Identity (IMSI), an International Mobile Station Equipment Identity (IMEI), a Mobile Equipment Identifier (MEID), a media access control (MAC) address, or another type of (unique) identifier of end device 180 or a user of end device 180) impacted by the congestion or anticipated to be impacted by the congestion. The RUCI may also include a wireless station identifier of wireless station 110 impacted by or anticipated to be impacted by congestion. For example, the identifier may identify an eNB, a gNB, or another type of wireless station 110. Additionally, or alternatively, the RUCI may include a cell identifier or a sector identifier regarding wireless station 110.

According to other exemplary implementations, the RUCI may include additional, different, and/or fewer instances of information. For example, the RUCI may include a RAN identifier (e.g., a group of wireless stations 110), a packet data network (PDN) identifier, an access point name (APN) operator identifier, an identifier of a communication link, a type of DC service, and/or other types of information that indicates a context of a communication session associated with the RAN to which the congestion pertains and/or is anticipated to pertain.

According to an exemplary embodiment, RCAF 115 includes logic that transmits or makes available for retrieval the RUCI to MEC system 125 in support of the traffic control service. According to an exemplary implementation, RCAF 115 includes an interface to MEC system 125 that supports the communication of the RUCI to MEC system 125. The RUCI may be communicated using a suitable protocol and format, such as Diameter attribute value pairs (AVPs) or another suitable protocol/format. As previously described, according to an exemplary embodiment, a network device of the MEC provides the traffic control service. Described below are exemplary implementations of such an embodiment.

Figure 1C:
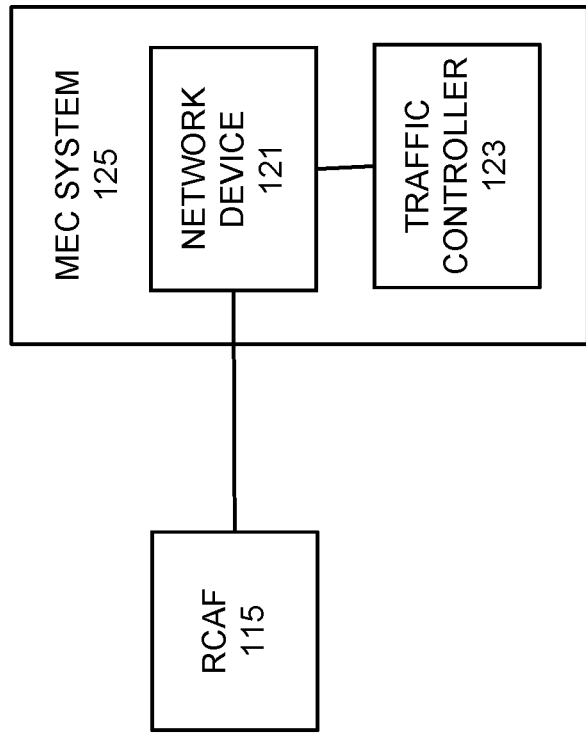
FIGS. 1B and 1C are diagrams illustrating exemplary configurations that may provide an exemplary embodiment of the traffic control service.
Figure 1B:
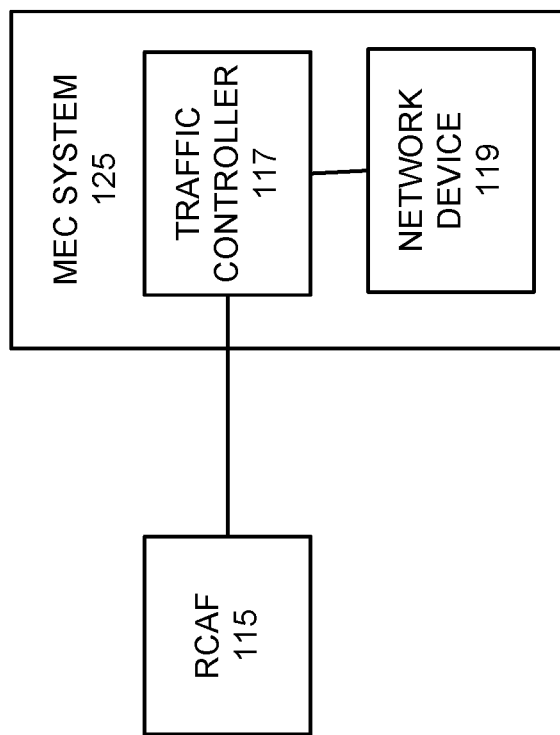

FIG. 1B is a diagram illustrating an exemplary implementation of an RCAF and MEC configuration in which RCAF 115 may be communicatively coupled to MEC system 125. For example, a traffic controller 117 may include logic that ingests the RUCI from RCAF 115 and uses the RUCI to select and implement remedial measures to mitigate congestion when congestion is present in access network 105 or a portion thereof. Additionally, for example, traffic controller 117 may include logic that ingests the MUCI, as previously described. For example, a network device 119 of MEC system 125 may monitor and/or collect user plane congestion information associated with MEC system 125. Network device 119 may store context information pertaining to network devices and communication links of MEC system 125. Network device 119 may also include logic that detects when a network resource (e.g., a network device, communication link, etc.) is no longer congested or no longer anticipated to become congested. Network device 119 may generate and transmit (or make available) the MUCI to traffic controller 117 indicating such a state.

According to an exemplary implementation, the MUCI may include congestion level information (e.g., low, medium, high, etc.). The MUCI may also include an identifier of a network device of MEC system 125, which may be impacted by congestion or is anticipated to be impacted by congestion. For example, the network device may provide the MEC application/service (e.g., a server, a VNF, etc.). The MUCI may further include an identifier of a communication link within MEC system 125 and/or an identifier of a communication link between MEC system 125 and access network 105 (e.g., wireless network device 110, etc.).

According to other exemplary implementations, the MUCI may include additional, different, and/or fewer instances of information. For example, the MUCI may further include information indicating a type of application/service (e.g., real-time, non-real-time, critical, smart public transportation, virtual reality, augmented reality, interactive, private communication, IoT, etc.), a traffic parameter (e.g., resolution, a Quality-of-Service parameter, delivery (e.g., unicast, multicast, broadcast, etc.), and/or direction of traffic flow (e.g., uplink, downlink, bidirectional, etc.) to which the congestion may pertain or is anticipated to pertain. Additionally, or alternatively, the MUCI may include other types of information that indicate a context of a communication session associated with MEC system 125.

Traffic controller 117 may include logic that uses the MUCI and/or the RUCI to select and implement measures to mitigate congestion relative to these portions of the communication path.

FIG. 1C is a diagram illustrating another exemplary implementation of an RCAF and MEC configuration in which RCAF 115 may be communicatively coupled to MEC system 125. For example, a network device 121 may be implemented as, for example, a local Policy and Charging Rules Function (PCRF), a policy server, or another type of network device that includes logic that ingests the RUCI from RCAF 115. Network device 121 may also include logic that ingests MUCI. Network device 121 may also store traffic control policies that may be used by the traffic control service. A traffic controller 123 may be communicatively coupled to network device 121, and may include logic that obtains the RUCI and/or the MUCI from network device 121. Traffic controller 123 may include logic that uses the RUCI and/or the MUCI to select and invoke remedial measures to mitigate congestion when congestion is present in a communication path.

As previously described, traffic controller 117 or traffic controller 123 (traffic controller 117/123) may include logic that uses the RUCI and/or the MUCI to select and invoke a remedial measure to mitigate congestion and/or anticipated congestion in a communication path between MEC system 125 and end device 180. According to an exemplary embodiment, traffic controller 117/123 may include an algorithm that selects a congestion control measure based on the RUCI and/or the MUCI. For example, various parameters/values of the RUCI and/or the MUCI may serve as arguments to select the congestion control measure, such as, for the example, the level of congestion, the location of the congestion, the direction of the traffic flow, and so forth. According to other exemplary embodiments, traffic controller 117/123 may correlate the RUCI and/or the MUCI with traffic control policies, and based on such correlation, select a congestion control measure to invoke.

According to various exemplary embodiments, the traffic control service may use open loop congestion control methods (e.g., congestion avoidance methods), closed loop congestion control methods (e.g., congestion recovery methods), or a combination thereof to mitigate congestion. Traffic controller 117/123 may communicate with network devices in MEC system 125 and/or access network 105 (e.g., wireless station 110) to invoke or execute a congestion control action. Additionally, for example, traffic controller 117/123 may communicate with end device 180 to invoke or execute a congestion control action.

Traffic controller 117/123 may use various congestion control actions to mitigate congestion and/or anticipated congestion. For example, traffic controller 117/123 may cause a network device of MEC 125 and/or end device 180 to throttle user plane traffic in the uplink and/or the downlink. By way of further example, a video stream may be downgraded in resolution from one resolution to a lower resolution. Alternatively, a transmission bitrate may be reduced. According to another example, traffic controller 117/123 may cause end device 180 to select and switch from one wireless access technology to another wireless access technology. By way of further example, end device 180 may switch from using a 4G RAN to a WiFi network or a Bluetooth network to communicate with MEC system 125.

According to yet another example, in a context of an EN-DC environment and non-standalone (NSA) traffic flow, traffic controller 117/123 may throttle traffic (e.g., at MEC system 125 and/or end device 180) to avoid overloading a core network-originated data radio bearer (DRB) on an Xn interface. According to still other examples, in a context of dual or higher connectivity scenario, traffic controller 117/123 may balance traffic across the two or more communication paths. For example, traffic controller 117/123 may determine the congestion levels between the two or more wireless access communication paths, and adjust an amount of traffic flow allocated to each communication path. By way of further example, in a context of EN-DC and standalone (SA) traffic flow, traffic controller 117/123 may identify the least congested communication path/RAT among the multiple communication paths of the dual or higher connectivity, and may dynamically shift a traffic flow supported by a more congested communication path/RAT to a lesser congested communication path/RAT. In this way, traffic controller 117/123 may reduce congestion and/or minimize the likelihood of congestion in view of an anticipated congestion, by balancing traffic flows across the two or more communication links.

According to still another example, traffic controller 117/123 may direct end device 180 to search and connect to another wireless station 110. For example, in a dual or higher connectivity scenario, or a single connectivity scenario, end device 180 may search and establish a connection with a wireless station 110 that is different from a wireless station 110 that end device 180 may be currently connected to and using to support a communication session with MEC system 125. By way of further example, end device 180 may search and switch from a current wireless station 110 (e.g., eNB, gNB, eLTE eNB, etc.) to another wireless station 110 (e.g., eNB, gNB, eLTE eNB, etc.) and maintain the singular or higher connectivity.

According to other exemplary embodiments, traffic controller 117/123 may invoke a congestion control action not based on received RUCI and/or MUCI. For example, traffic controller 117/123 may receive a command from a network device of a core network (e.g., a PCRF, etc.) to invoke a congestion control action. By way of further example, traffic controller 117/123 may be instructed to throttle traffic associated with one or multiple network devices of MEC system 125 (e.g., application server, etc.) and/or another type of congestion control action. In this way, core network traffic to end devices 180 via access network 105 may be given a higher priority to use access network resources (e.g., wireless station 110, communication links, etc.) than MEC system 125.

Although FIGS. 1B and 1C illustrate exemplary RCAF and MEC configurations, according to other implementations, additional, different, and/or fewer network devices may be implemented. Additionally, for example, a function provided by multiple network devices may be implemented by a single network device, and a function provided by a single network device may be implemented by multiple network devices in which each network device contributes to provide such function. Additionally, as described further below in relation to FIG. 1D, other configurations may be implemented in which a network device external from MEC system 125 may be used to provide the traffic control service.

Although exemplary congestion control procedures/actions have been described in relation to traffic controller 117/123, according to other exemplary implementations, traffic controller 117/123 may invoke another type of action not specifically described herein. For example, traffic controller 117/123 may change or update various polices that may be implemented in environment 100. For example, the various policies may relate to a retransmission policy, a window policy, an acknowledgement policy, a discarding policy, and/or an admission policy. Further, the traffic control service may use other types of congestion control actions or methods, such as choke packets, implicit/explicit signaling, random early discard, explicit congestion notification (ECN), Transmission Control Protocol (TCP) rate control, various algorithms (e.g., leaky bucket, token bucket, fast retransmit/fast recovery, etc.). These other types of congestion control actions/methods may be invoked by traffic controller 117/123 and/or various devices in environment 100 may perform such action without direction from traffic controller 117/123.

Referring back to FIG. 1A, RCAF 115 may store context information pertaining to wireless station 110, a cell of wireless station 110, a sector of wireless station 110, a communication link, and/or end device 180. RCAF 115 may also include logic that detects when wireless station 110, a cell, a sector of wireless station 110, or a communication link is no longer congested or no longer anticipated to become congested. RCAF 115 may generate and transmit (or make available) the RUCI to MEC system 125 indicating such a state.

MEC system 125 includes a platform that provides applications and services at the edge of a network. MEC system 125 may be implemented using one or multiple technologies including, for example, network function virtualization (NFV), software defined networking (SDN), cloud computing, Infrastructure-as-a-Service (IaaS), or another type of network technology. Depending on the implementation, MEC system 125 may include, for example, virtualized network functions (VNFs), multi-access (MA) applications/services, and/or servers. MEC system 125 may also include other network elements that support its operation, such as, for example, a network functions virtualization orchestrator (NFVO), a virtualized infrastructure manager, an operations support system (OSS), a virtual network function manager (VNFM), and/or other types of network elements, network resources, and so forth.

According to an exemplary embodiment, MEC system 125 includes logic that provides the traffic control service. For example, with reference to FIGS. 1B and 1C, MEC system 125 may include one or multiple network devices that ingest the RUCI and/or the MUCI, uses the RUCI and the MUCI to determine whether congestion exists or is anticipated, and causes remedial actions to be taken.

Core network 150 may include one or multiple networks of one or multiple network types and technologies. Core network 150 may include a complementary network of access network 105. For example, core network 150 may be implemented to include an Evolved Packet Core (EPC) of an LTE or an LTE-Advanced network, a next generation core (NGC) network, and/or a legacy core network. Depending on the implementation of core network 150, although not illustrated, core network 150 may include various network devices, such as for example, a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described.

End device 180 includes a device that has computational and wireless communication capabilities. End device 180 may be implemented as a mobile device, a portable device, or a stationary device. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, or other types of wireless user devices. End device 180 may be configured to execute various types of software (e.g., applications, programs, etc.). The number and the types of software may vary among end devices 180. End device 180 may support multiple RATs (e.g., 4G, 5G, etc.), multiple frequency bands, and so forth. Additionally, end device 180 may include one or multiple communication interfaces that provide one or multiple (e.g., simultaneous) connections via the same or different RATs, frequency bands, and so forth. The multimode capabilities of end device 180 may vary among end devices 180.

According to an exemplary embodiment, end device 180 includes logic that supports the traffic control service, as described herein. For example, end device 180 includes logic that executes a congestion control procedure/action. End device 180 may communicate with traffic controller 117/123 (e.g., to receive a command, etc.).

Figure 1D:
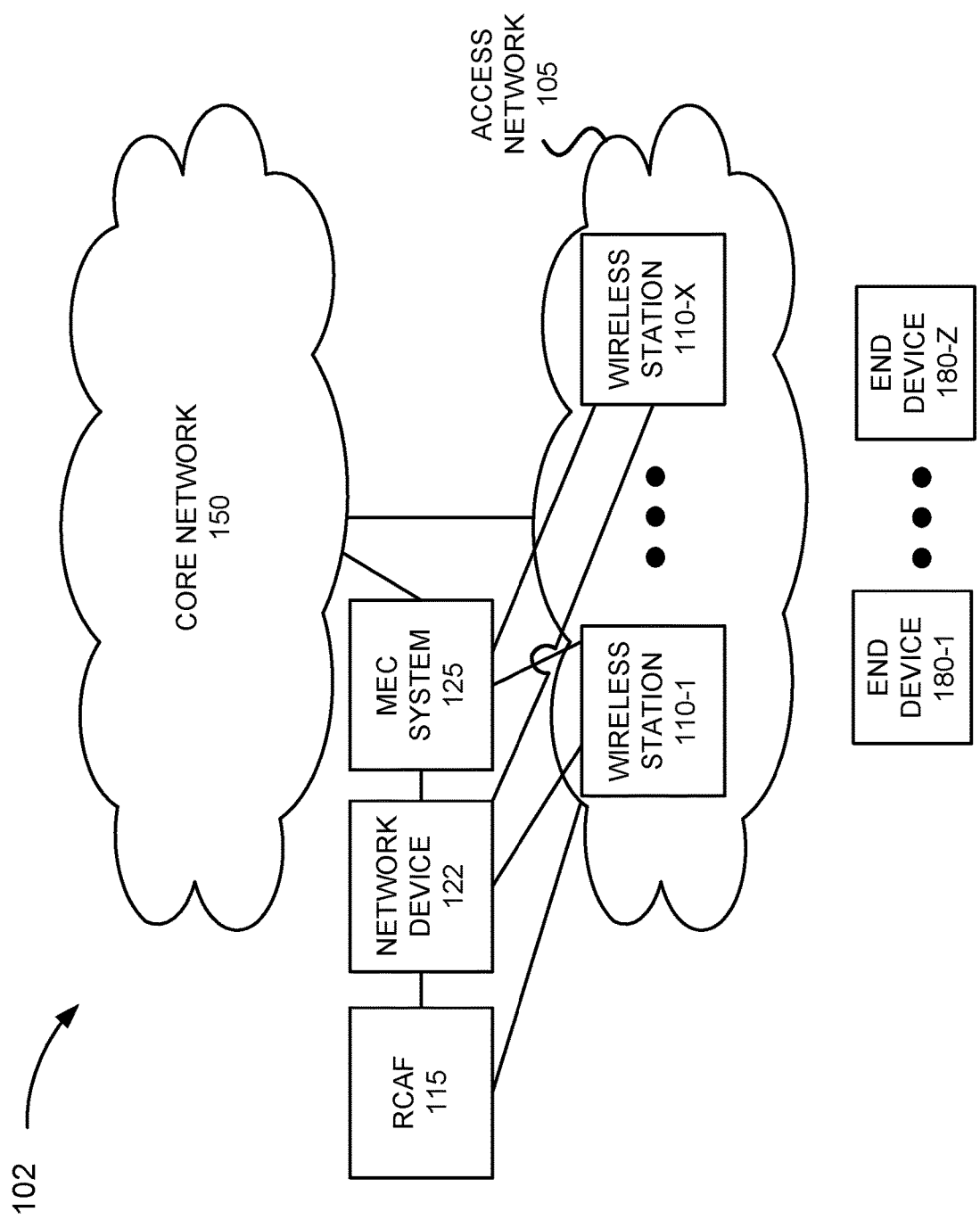
FIG. 1D is a diagram illustrating another exemplary environment in which an exemplary embodiment of the traffic control service may be implemented.

FIG. 1D is a diagram illustrating an exemplary environment 102 in which another exemplary embodiment of the traffic control service may be implemented. In contrast to environment 100, the traffic control service may be implemented by a network device 122 that is external from MEC system 125. Network device 122 may include network devices similar to those previously described in relation to FIGS. 1B and 1C, and/or another network device, as described herein.

Figure 2A:
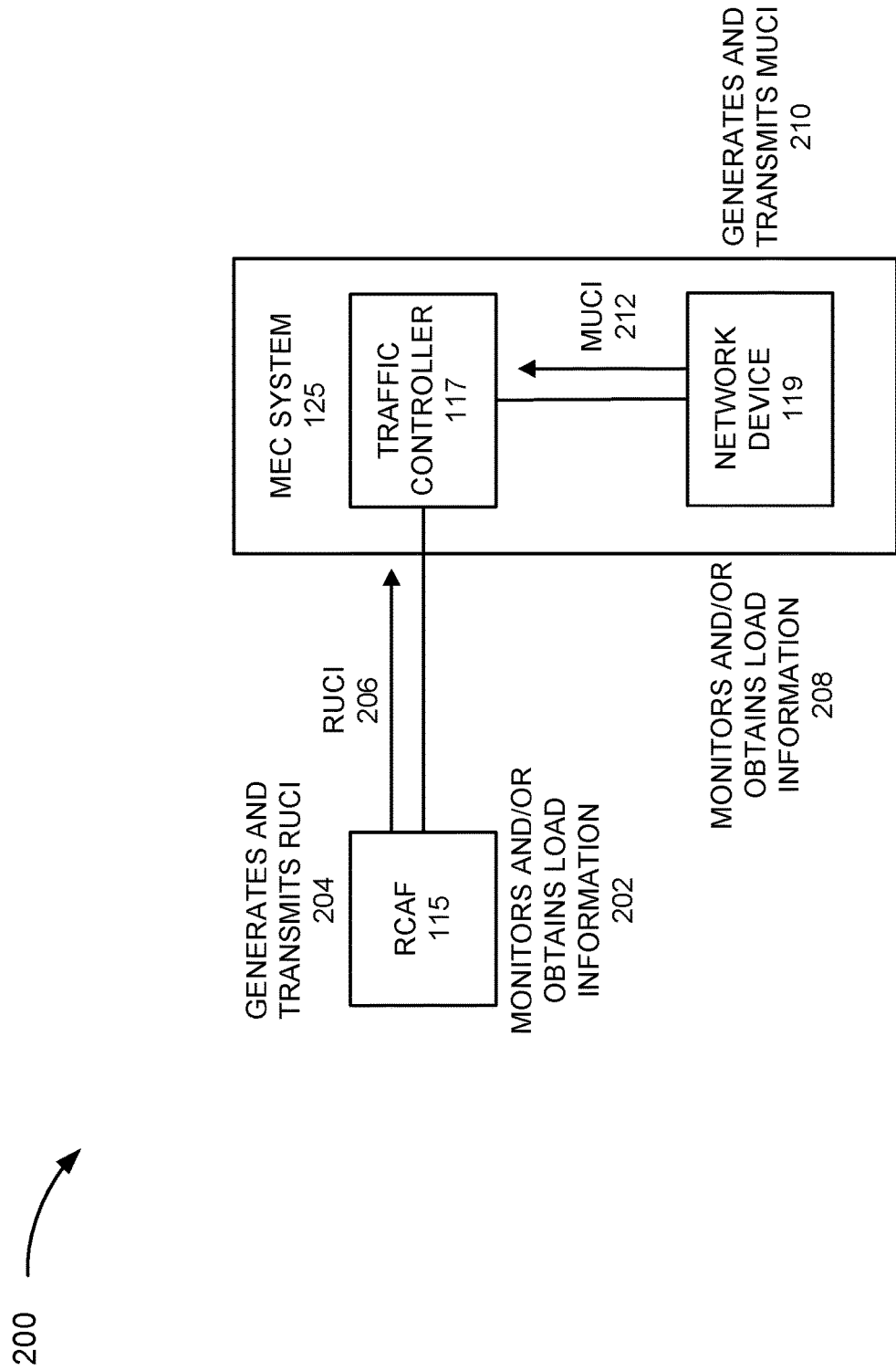
FIGS. 2A-2F are diagrams illustrating exemplary processes of exemplary embodiments of the traffic control service according to various exemplary configurations.

FIGS. 2A-2F are diagrams illustrating exemplary processes of the traffic control service. For example, FIGS. 2A-2D are diagrams illustrating an exemplary process of the traffic control service that may be implemented according to the configuration previously described in relation to FIG. 1B. Referring to FIG. 2A, according to an exemplary process 200, as illustrated, RCAF 115 may monitor and/or obtain load information 202. For example, the load information may relate to congestion in the user plane of access network 105. In response to obtaining the load information, RCAF 115 may generate and transmit RUCI 204 to traffic controller 117. Traffic controller 117 may receive RUCI 206. Additionally, for example, network device 119 may monitor and/or obtain load information 208 relating to MEC system 125. Network device 119 may generate and transmit the MUCI 210 to traffic controller 117. Traffic controller 117 may receive MUCI 212.

Figure 2B:
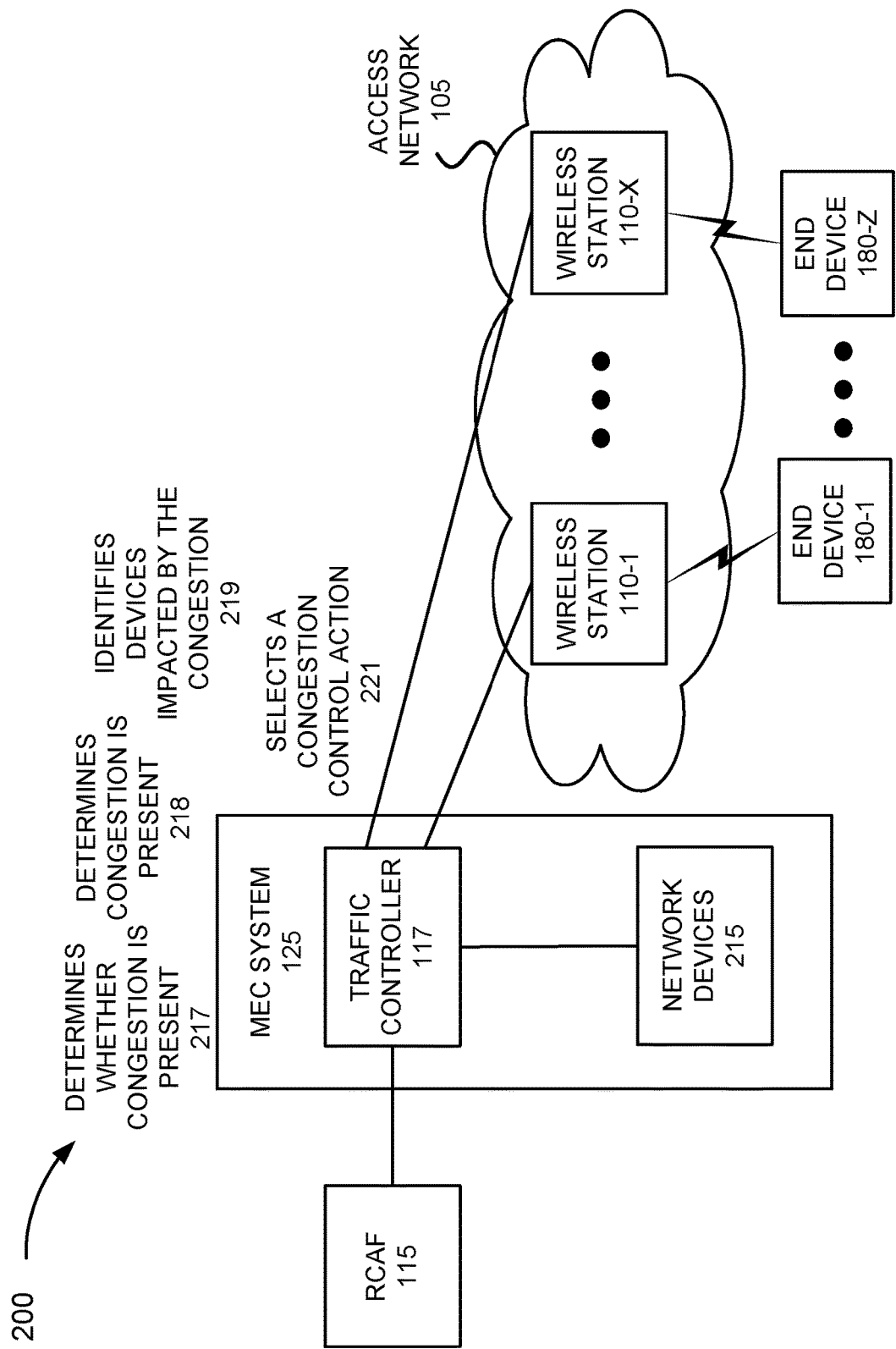

Referring to FIG. 2B, traffic controller 117 may determine whether there is congestion present. For example, traffic controller 117 may analyze the congestion levels included in the RUCI and the MUCI. According to this exemplary scenario, assume that traffic controller 117 determines that congestion is present 218. Traffic controller 117 may identify devices (e.g., end devices 180, wireless stations 110, and/or network devices 215 of MEC system 125 (e.g., MEC application VNFs, etc.) that may be impacted by the congestion 219. In response, traffic controller 112 selects a congestion control action 221 to mitigate the congestion. As previously described, traffic controller 117 may select the action based on the congestion level, the locale of the congestion, the direction of a traffic flow, the type of application/service, and/or other factors/information included in the RUCI and/or the MUCI.

Figure 2C:
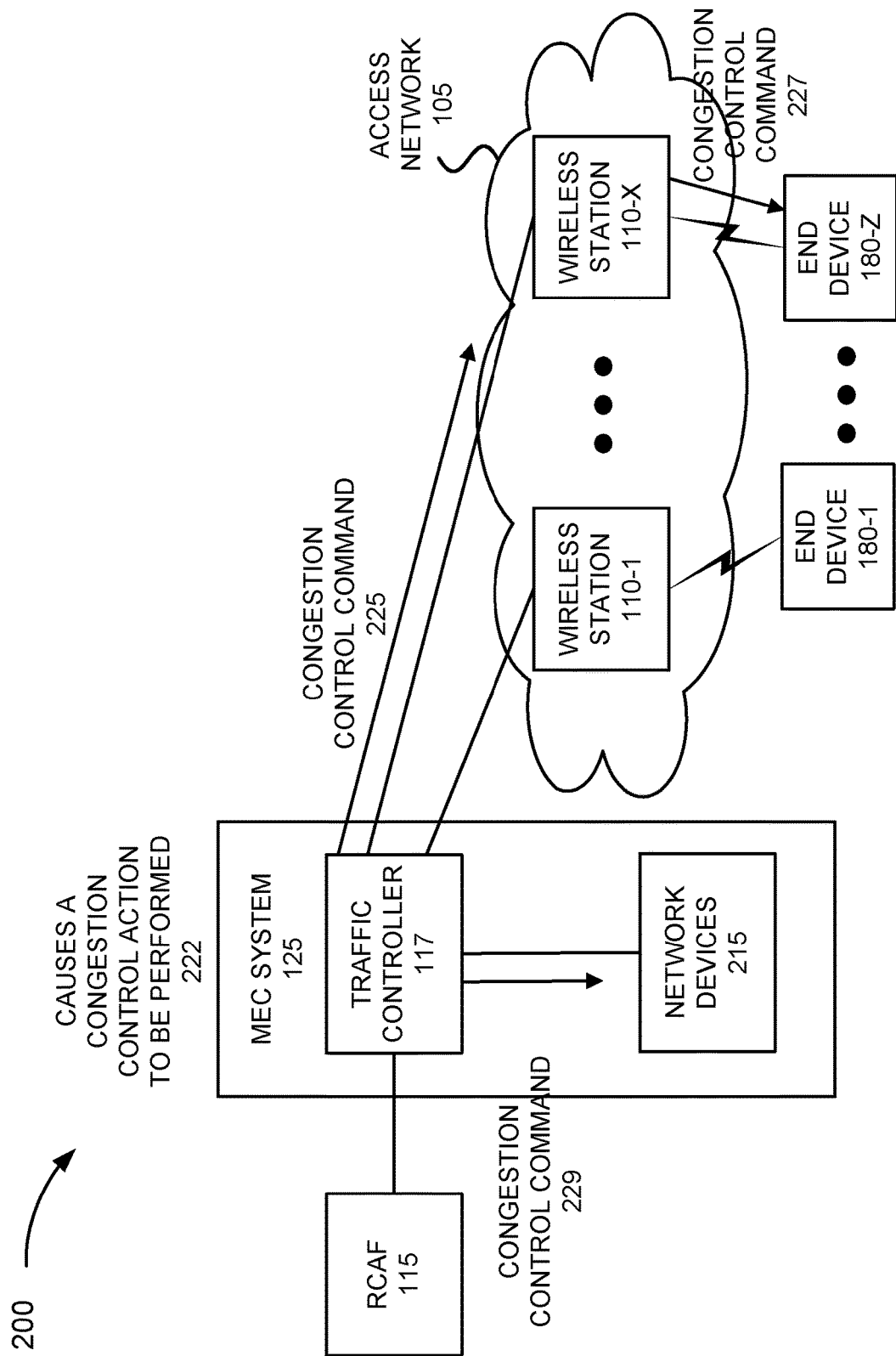
Figure 2D:
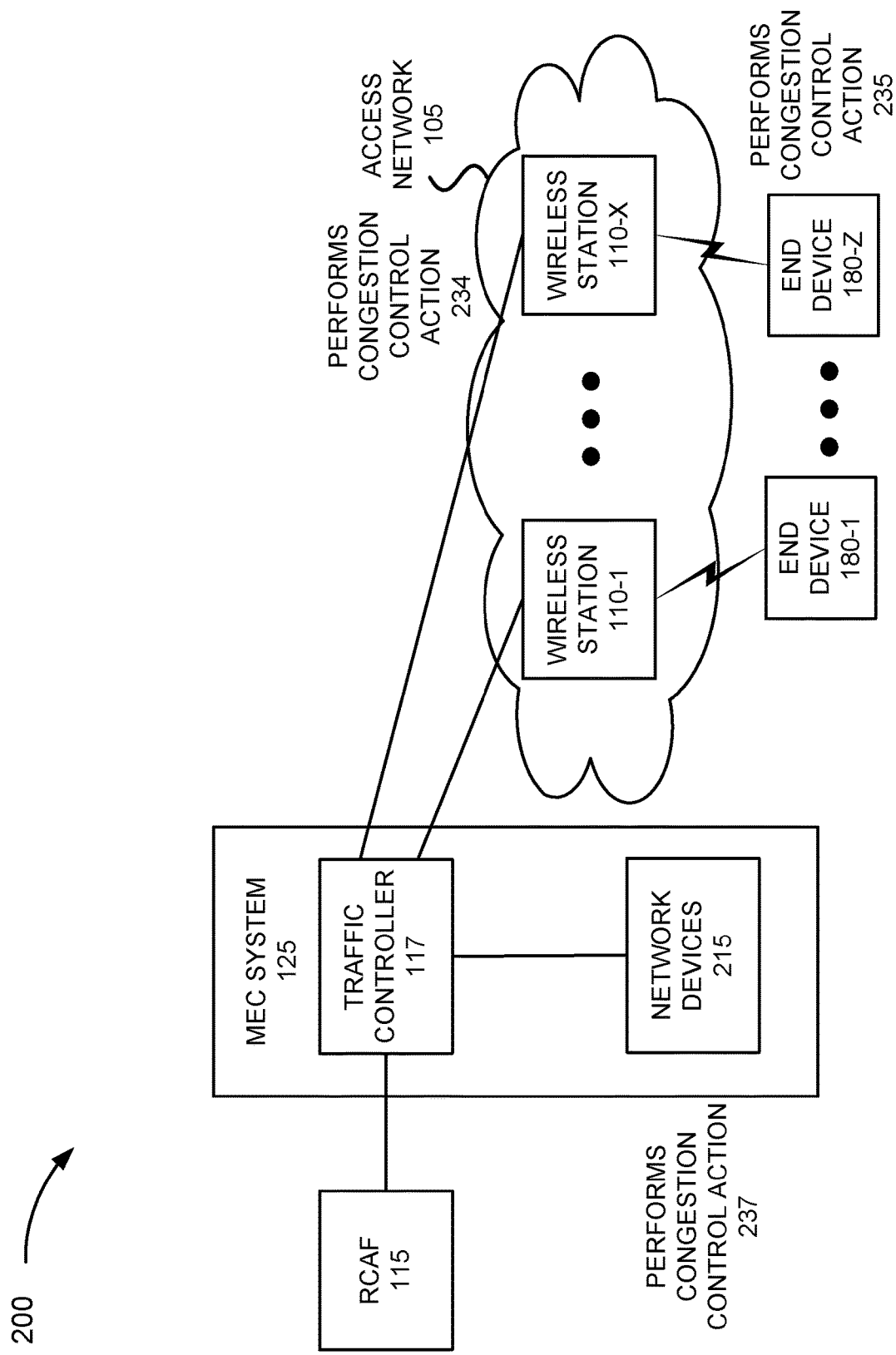

Referring to FIG. 2C, based on the selection of the congestion control action, traffic controller 117 may cause a congestion control action to be performed 222. For example, traffic controller 117 may generate and transmit congestion control commands to one or multiple devices (e.g., end device 180, wireless station 110, network device 215). In turn, wireless station 110 may receive a congestion control command 225, end device 180 may receive a congestion control command 227, and/or network device 215 may receive a congestion control command 229. Referring to FIG. 2D, in response to receiving the congestion control command, the device may perform a congestion control action in correspondence to the congestion control command. For example, wireless station 110 may perform a control action 234, end device 180 may perform a congestion control action 235, and/or network device 215 may perform a congestion control action 237.

Figure 2E:
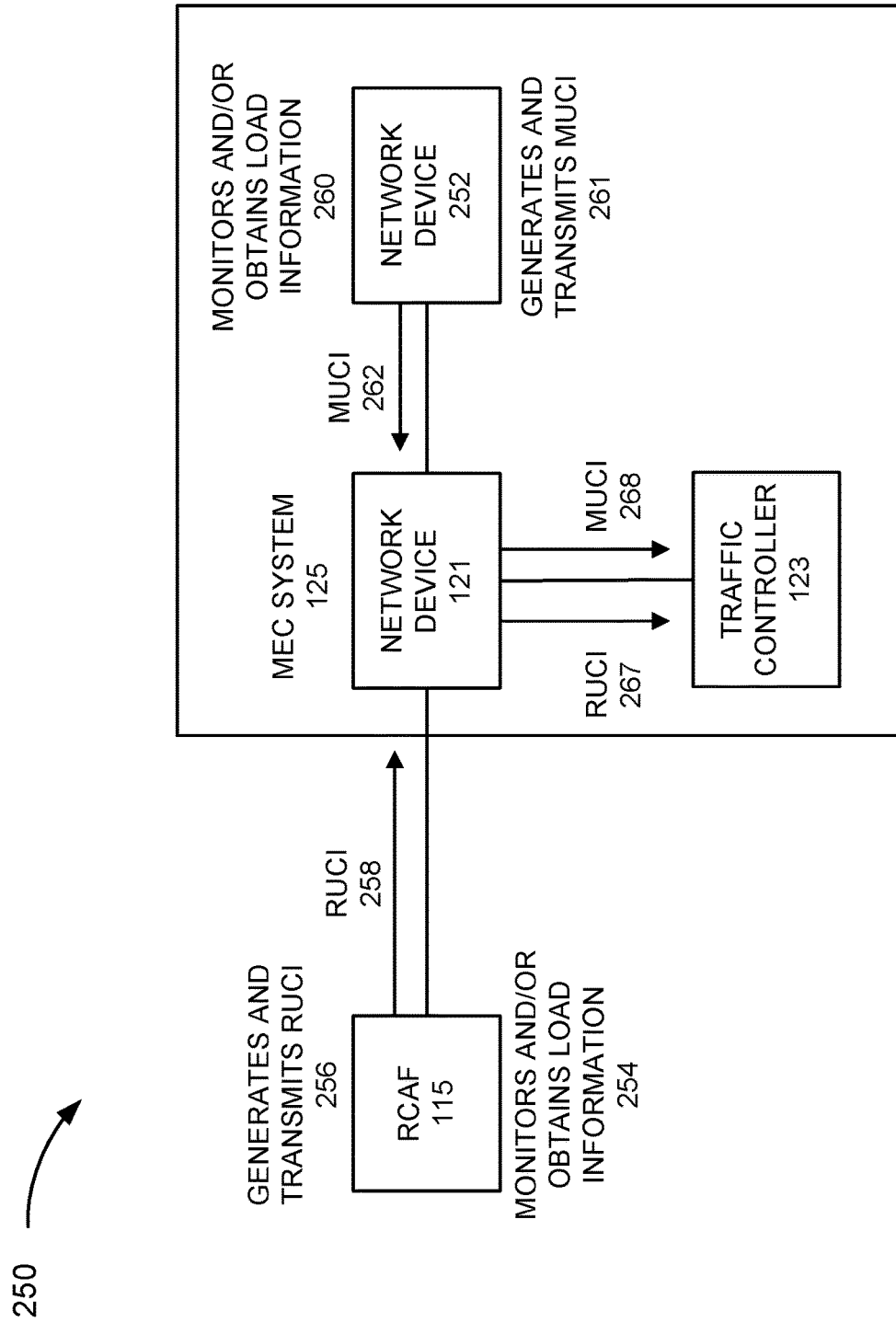

FIG. 2E is a diagram illustrating another exemplary process of the traffic control service. For example, FIG. 2E is a diagram illustrating an exemplary process of the traffic control service that may be implemented according to the configuration previously described in relation to FIG. 1C. Referring to FIG. 2E, according to an exemplary process 250, RCAF 115 may monitor and/or obtain load information 254 in relation to access network 105 (e.g., wireless stations 110). RCAF 115 may generate and transmit RUCI 256 to network device 121. Network device 121 may receive and store RUCI 258. A network device 252 of MEC system 125 may monitor and/or obtain load information 260 for network devices 215 (not illustrated). For example, network device 252 may provide a function analogous to RCAF 115 except that the function relates to network devices of MEC system 125, as previously described. Network device 252 may generate and transmit MUCI 261 to network device 121. Network device 121 may receive and store MUCI 262. Subsequently, traffic controller 123 may use RUCI 267 and MUCI 268 to determine whether congestion is present. Traffic controller 123 may perform operations similar to those previously described in relation to FIGS. 2B and 2C.

Figure 2F:
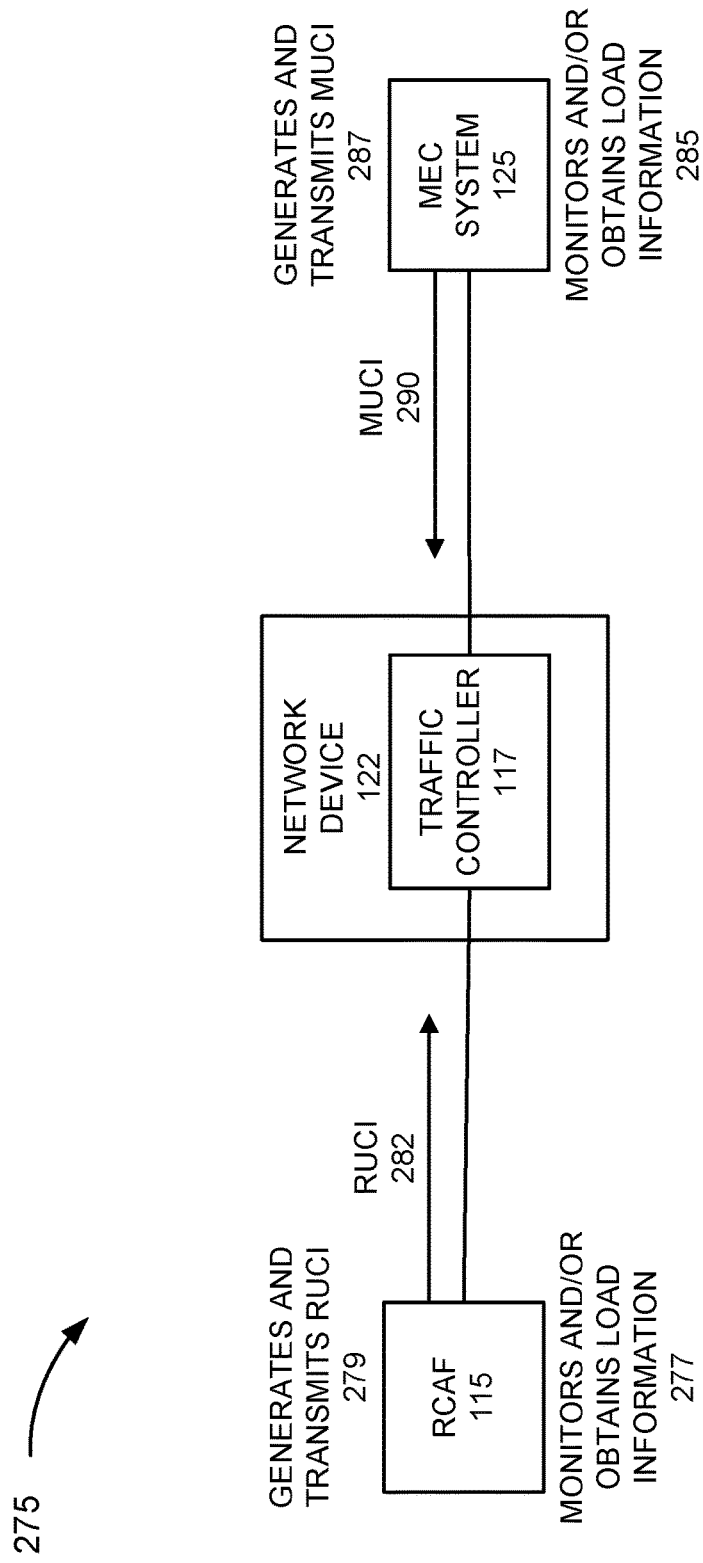

FIG. 2F is a diagram illustrating yet another exemplary process of the traffic control service. For example, FIG. 2F is a diagram illustrating an exemplary process of the traffic control service that may be implemented according to the configuration previously described in relation to FIG. 1D. Referring to FIG. 2F, according to an exemplary process 275, RCAF 115 may monitor and/or obtain load information 277 in relation to access network 105 (e.g., wireless stations 110). RCAF 115 may generate and transmit RUCI 279 to network device 122, which includes traffic controller 117. Traffic controller 117 may receive and store RUCI 282. Additionally, for example, MEC system 125 (e.g., network device 252 (not illustrated)) may monitor and/or obtain load information 285. MEC system 125 may generate and transmit MUCI 287 to network device 122. Traffic controller 117 may receive and store MUCI 290. Subsequently, traffic controller 117 may use RUCI 282 and MUCI 290 to determine whether congestion is present. Traffic controller 117 may perform operations similar to those previously described in relation to FIGS. 2B and 2C.

Although FIGS. 2A-2F illustrate exemplary processes of the traffic control service, according to other exemplary embodiments, a process may include additional, different, and/or fewer steps, and/or include additional, different, and/or fewer messages. For example, traffic controller 117/123 may determine whether there is an anticipated congested state.

Figure 3A:
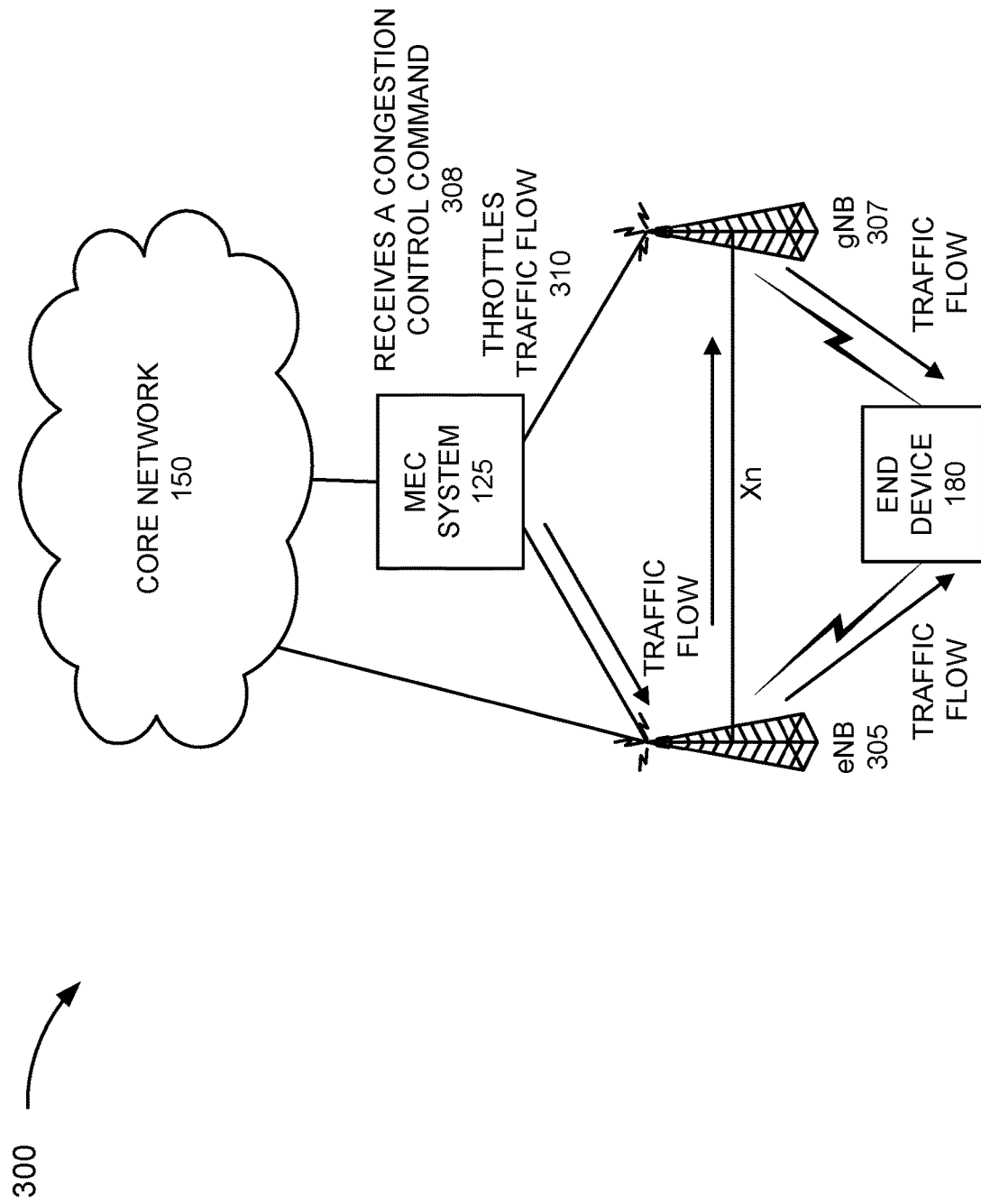
FIGS. 3A-3D are diagrams illustrating other exemplary processes of exemplary embodiments of the traffic control service according to various exemplary scenarios.
Figure 3B:
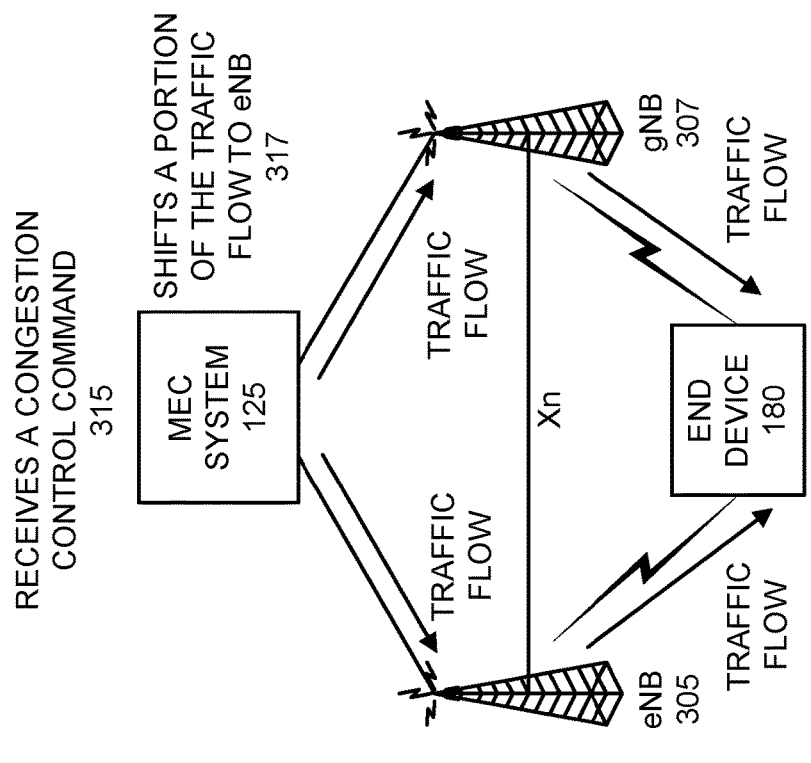
Figure 3C:
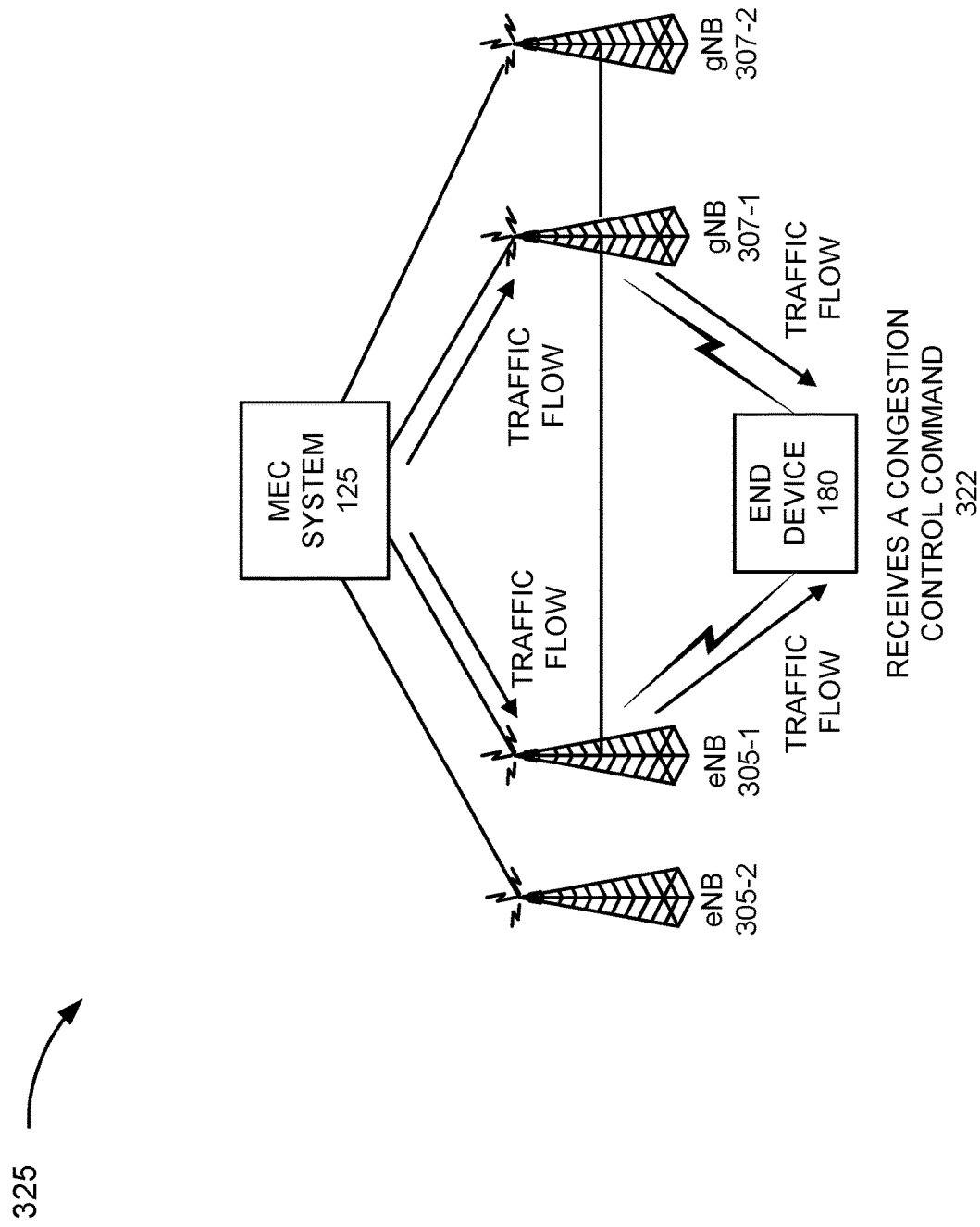

FIGS. 3A-3C are diagrams illustrating still other exemplary processes of the traffic control service. Referring to FIG. 3A, assume that end device 180 is receiving a traffic flow from MEC system 125 via wireless stations 110 (e.g., eNB 305 and gNB 307) according to a dual connectivity scenario in which a split DRB has been established. Subsequently, MEC system 125 (e.g., network device 215) may receive a congestion control command 308 from traffic controller 117. Alternatively, MEC system 125 may receive the congestion control command 308 from a network device of core network 150 (e.g., PCRF) (e.g., versus a local PCRF, policy server, etc. associated with MEC system 125). For example, RCAF 115 may provide RUCI to the PCRF. According this example, the congestion control command may indicate to throttle a traffic flow 310. In response to receiving the congestion control command, MEC system 125 may reduce the bitrate of the downlink traffic flow to end device 180.

Referring to FIG. 3B, assume that end device 180 is receiving traffic flows from MEC system 125 via wireless stations 110 (e.g., eNB 305 and gNB 307) according to a dual connectivity scenario in which non-split DRBs have been established. Subsequently, MEC system 125 (e.g., network device 215) may receive a congestion control command 315 from traffic controller 117. According to this example, the congestion control command may indicate to shift a portion of the traffic flow currently using gNB 307 to eNB 305. For example, the congestion control command may indicate the portion or the amount of the traffic flow (e.g., in terms of transmission bit rate). As an example, before receiving the congestion control command, 50% of the traffic flow may be supported by each communication path via eNB 305 and gNB 307. However, subsequent to receiving the congestion control command, 70% of the traffic flow may be supported by the communication path via eNB 305, while 30% of the traffic flow may be supported by the communication path via gNB 307. According to other exemplary scenarios, the amount of the traffic flow shift may be numerically different.

Figure 3D:
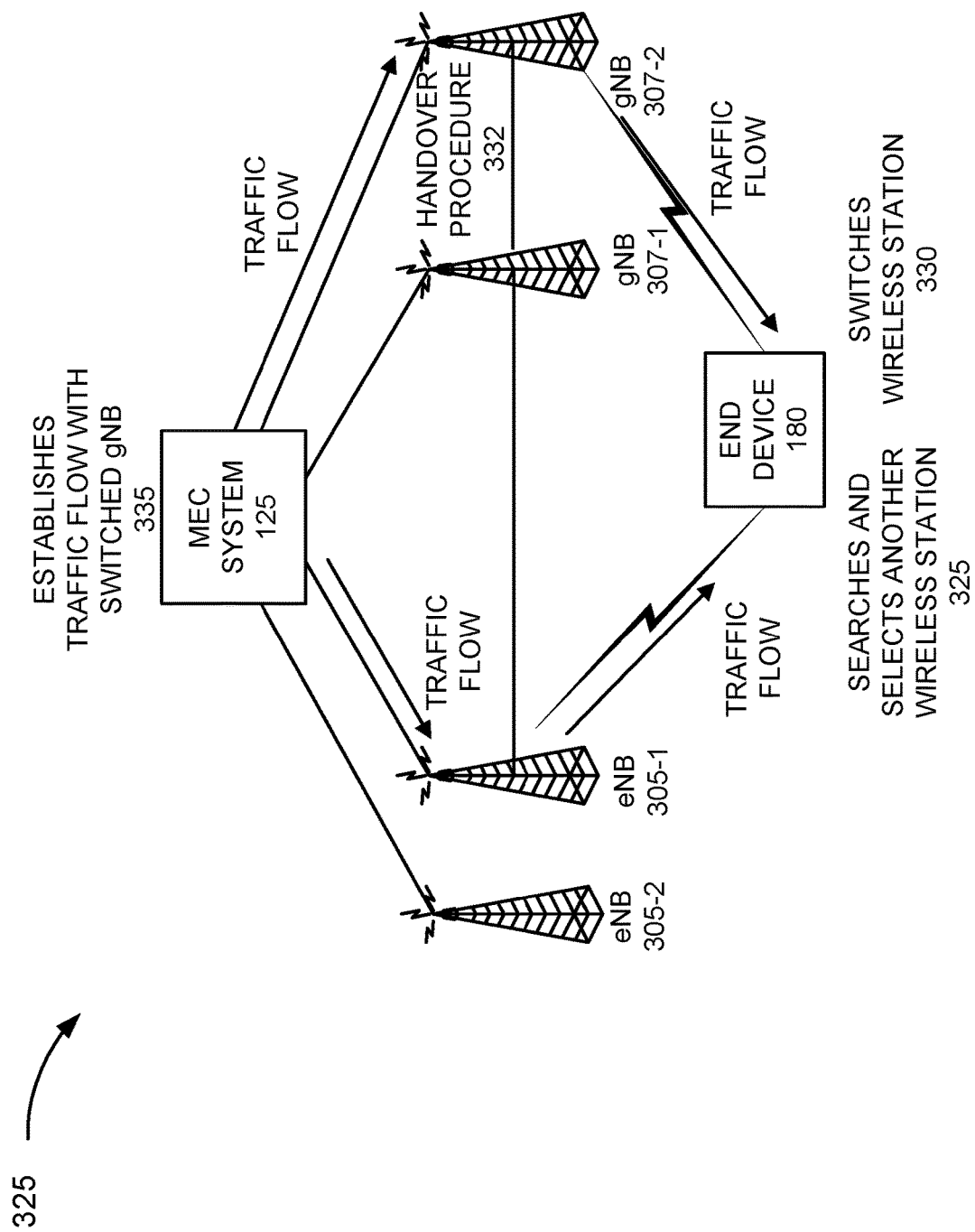

Referring to FIG. 3C, assume that end device 180 traffic flows from MEC system 125 via wireless stations 110 (e.g., eNB 305 and gNB 307) according to a dual connectivity scenario in which non-split DRBs have been established. Subsequently, end device 180 may receive a congestion control command 322 from traffic controller 117 via eNB 305-1 and/or gNB 307-1. According to this example, the congestion control command may indicate to search and select another master wireless station or another secondary wireless station. For purposes of description, assume that the current master wireless station is eNB 305-1 and the current secondary wireless station is gNB 307-1. Referring to FIG. 3D, in response to receiving the congestion control command, end device 180 searches and selects another secondary wireless station to which to attach 325. End device 180 may establish an RRC connection with gNB 307-2 and switches 330 from its current secondary wireless station (e.g., gNB 307-1) to a new secondary wireless station (e.g., gNB 307-2). As further illustrated, gNBs 307-1 and 307-2 may perform a handover procedure 332. MEC system 125 may also establish a traffic flow connection with the switched gNB 335.

Although FIGS. 3A-3D illustrate exemplary processes of the traffic control service, according to other exemplary embodiments, a process may include additional, different, and/or fewer steps, and/or include additional, different, and/or fewer messages.

FIG. 4 is a diagram illustrating exemplary components of a device 400 that may be included in one or more of the devices described herein. For example, device 400 may correspond to components included in wireless station 110, RCAF 115, traffic controller 117, network device 119, network device 121, network device 122, traffic controller 123, MEC system 125, end device 180, network device 215, and/or network device 252. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to traffic controller 117/123, software 420 may include an application that, when executed by processor 410, provides a function of the traffic control service, as described herein. Additionally, with reference to network device 119, network device 121, network device 122, and other network devices/end devices 180 described herein, software 420 may include an application that, when executed by processor 410, provides a function of the traffic control service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
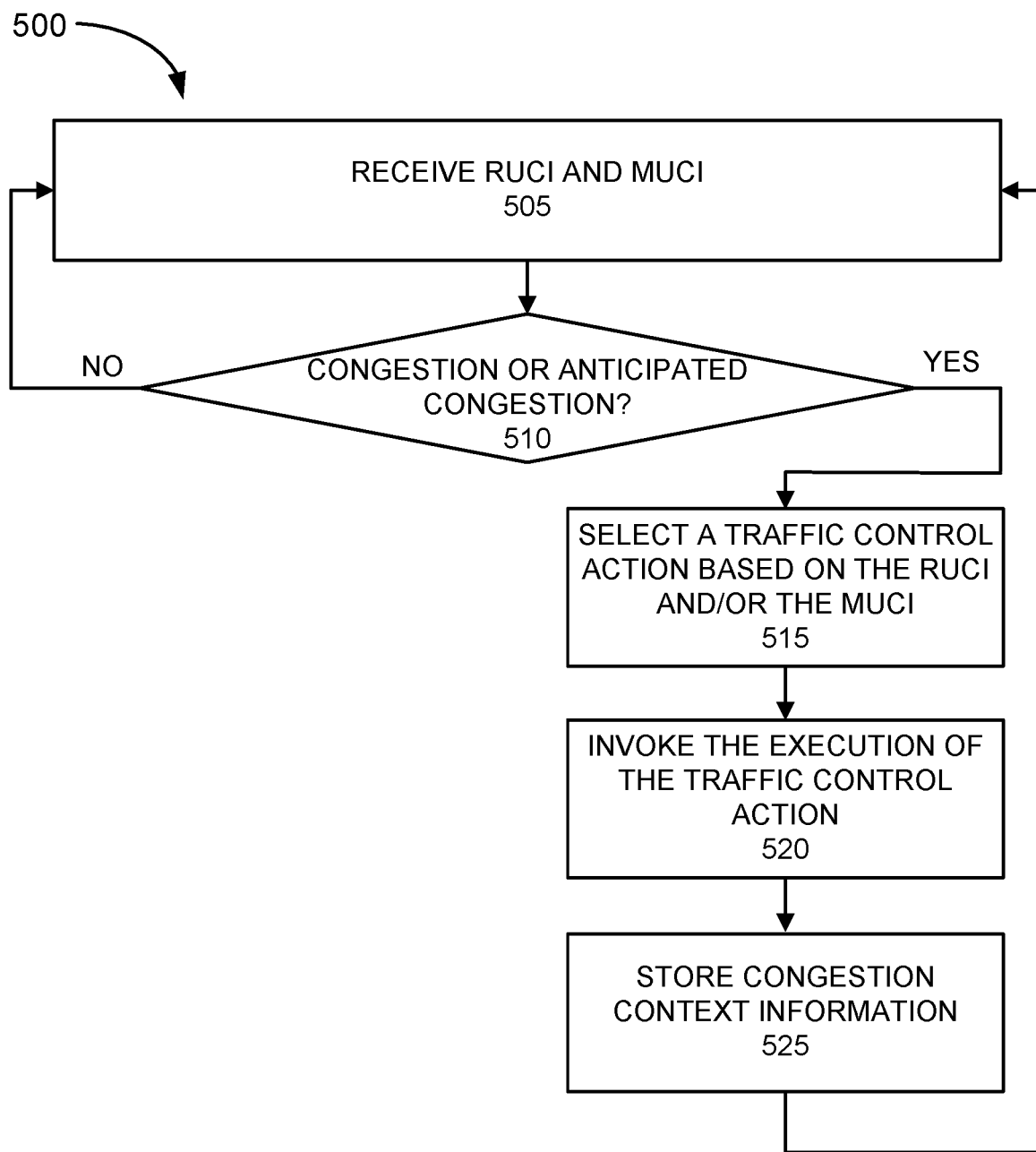
FIG. 5 is a flow diagram illustrating an exemplary process of an exemplary embodiment of the traffic control service.

FIG. 5 is a flow diagram illustrating an exemplary process 500 of an exemplary embodiment of the traffic control service. According to an exemplary embodiment, a network device (e.g., traffic controller 117 or 123) that provides the traffic control service, as described herein, may performs steps of process 500. For example, processor 410 executes software 420 to perform the step illustrated in FIG. 5, and described herein.

Referring to FIG. 5, in block 505, for example, a traffic controller may receive RUCI from a first network device (e.g., RCAF 115), and MUCI from a second network device (e.g., network device 119). As previously described, the RUCI may include congestion information pertaining to an access network (e.g., access network 105, a RAN, etc.). Additionally, as previously described, the MUCI may include congestion information pertaining a MEC (e.g., MEC system 125).

In block 510, it may be determined whether at least one of congestion or anticipated congestion is present. For example, the traffic controller may determine whether congestion is present and/or anticipated congestion is presented based on the RUCI and/or the MUCI. The traffic controller may analyze the RUCI and/or the MUCI, which each may include congestion levels, and determine whether congestion and/or anticipated congestion is present.

When it is determined that congestion or anticipated congestion is not present (block 510—NO), process 500 may return to block 505. For example, the traffic controller may wait for the next RUCI and/or the MUCI. Although not illustrated, the traffic controller may store congestion context information pertaining to the received RUCI and/or MUCI. For example, the congestion context information may indicate no congestion and/or no anticipated congestion relative to one or more network devices of the MEC and/or of the access network. According to other implementations, the traffic controller may not store congestion context information.

When it is determined that congestion or anticipated congestion is present (e.g., block 510—YES), a traffic control action may be selected based on the RUCI and/or the MUCI (block 515). For example, the traffic controller may select the traffic control action using an algorithm that uses parameters/values, which are included in the RUCI and/or the MUCI, as arguments. Additionally, or alternatively, the traffic controller may select the traffic control action based on other mechanisms, such as a correlation between a level of congestion or anticipated congestion to one or multiple traffic control actions/traffic control policies. The traffic controller may also identify network devices, end devices (e.g., end devices 180), and/or communication links that may be impacted by the congestion and/or the anticipated congestion. Additionally, or alternatively, the traffic controller may also identify network devices, end devices, and/or communication links that may be contributing to the congestion and/or the anticipated congestion based on a communication session associated with the MEC.

In block 520, the execution of the traffic control action may be invoked. For example, the traffic controller may communicate with a network device of the MEC, a network device of the access network, and/or an end device (e.g., end device 180) that may have been determined to be impacted by and/or contributing to the congestion and/or the anticipated congestion. As a part of the communication, the traffic controller may indicate a traffic control action (e.g., in a congestion control command).

In block 525, congestion context information may be stored. For example, the traffic controller (or another network device) may store congestion context information. The congestion context information may include information indicating a level of congestion or an anticipated congestion, a traffic control action invoked to mitigate the congestion or the anticipated congestion, and other identifiers (e.g., communication link, end device, network device of MEC, network device of access network, etc.) pertaining to the congestion or anticipated congestion. In this way, the traffic controller may have context information pertaining to a congestion issue, and if the issue continues or worsens, the traffic controller may have historical data from which to select additional and/or more aggressive measures to mitigate the congestion or anticipated congestion.

Although FIG. 5 illustrates an exemplary process 500 of the traffic control service, according to other embodiments, process 500 may include additional operations, fewer operations, and/or different operations than those illustrated in FIG. 5, and described herein. For example, the traffic control service may remove or reduce traffic control measures subsequent to the invocation of such measures when the RUCI and/or the MUCI indicate that a congestion level has been reduced, no congestion is present, and/or only an anticipated congestion is present. For example, the traffic controller may communicate with network devices or end devices to increase a transmission rate, etc.

As set forth in this description and illustrated by the drawings, reference is made to "an exemplary embodiment,"

"an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    receiving, by a network device, radio access network user plane congestion information (RUCI) and multi-access edge computing user plane congestion information (MUCI);
    determining, by the network device, whether at least one of congestion or an anticipated congestion is present in at least one of a radio access network to which the RUCI pertains or a multi-access edge computing (MEC) system to which the MUCI pertains;
    determining, by the network device based on at least one of the RUCI or the MUCI, that the at least one of the congestion or the anticipated congestion is present;
    selecting, by the network device, a traffic control action in response to determining that the at least one of the congestion or the anticipated congestion is present; and
    invoking, by the network device, the traffic control action to be carried out by at least one of a first network device of the radio access network, a second network device of the MEC system, or an end device in communication with the MEC system.

2. The method of claim 1, wherein the invoking comprises:
    transmitting, by the network device, to the at least one of the first network device, the second network device, or the end device, a message that indicates to perform the traffic control action.

3. The method of claim 2, wherein when the message is transmitted to the end device, the traffic control action indicates to the end device to disconnect from the first network device via which a current communication session with the MEC system is supported, and search and select a third network device via which to communicate with the MEC system.

4. The method of claim 2, wherein when the message is transmitted to the end device, the traffic control action indicates to the end device to switch from a first radio access technology (RAT) of the first network device via which a current communication session with the MEC system is supported, and use a second radio access technology (RAT), wherein the first RAT is different from the second RAT.

5. The method of claim 2, wherein when the message is transmitted to the second network device, the traffic control action indicates to the second network device to reduce a transmission rate of a current communication session between the end device and the second network device.

6. The method of claim 2, wherein when the message is transmitted to the end device, the traffic control action indicates to the end device to reduce a transmission rate of a current communication session between the end device and the MEC system.

7. The method of claim 1, further comprising:
identifying, by the network device, a congestion level for each of two or more communication paths that are being used to support two or more traffic flows between the end device and the MEC system in a dual or higher connectivity communication session, and wherein the selecting further comprises:
selecting, by the network device, the traffic control action that indicates to increase an amount of the two or more traffic flows for at least one of the two or more communication paths that has the congestion level that is less than the congestion level of another one of the two or more communication paths.

8. The method of claim 1, wherein the MUCI includes an identifier of an application server device of the MEC system.

9. A network device comprising:
a communication interface;
a memory, wherein the memory stores instructions; and
a processor, wherein the processor executes the instructions to:
receive, via the communication interface, radio access network user plane congestion information (RUCI) and multi-access edge computing user plane congestion information (MUCI);
determine whether at least one of congestion or an anticipated congestion is present in at least one of a radio access network to which the RUCI pertains or a multi-access edge computing (MEC) system to which the MUCI pertains;
determine, based on at least one of the RUCI or the MUCI, that the at least one of the congestion or the anticipated congestion is present;
select a traffic control action in response to the determination that the at least one of the congestion or the anticipated congestion is present; and
invoke the traffic control action to be carried out by at least one of a first network device of the radio access network, a second network device of the MEC system, or an end device in communication with the MEC system.

10. The network device of claim 9, wherein, when invoking, the processor further executes the instructions to:
transmit, via the communication interface, to the at least one of the first network device, the second network device, or the end device, a message that indicates to perform the traffic control action.

11. The network device of claim 10, wherein when the message is transmitted to the end device, the traffic control action indicates to the end device to disconnect from the first network device via which a current communication session with the MEC system is supported, and search and select a third network device via which to communicate with the MEC system.

12. The network device of claim 10, wherein when the message is transmitted to the end device, the traffic control action indicates to the end device to switch from a first radio access technology (RAT) of the first network device via which a current communication session with the MEC system is supported, and use a second radio access technology (RAT), wherein the first RAT is different from the second RAT.

13. The network device of claim 10, wherein when the message is transmitted to the second network device, the traffic control action indicates to the second network device to reduce a transmission rate of a current communication session between the end device and the second network device.

14. The network device of claim 10, wherein when the message is transmitted to the end device, the traffic control action indicates to the end device to reduce a transmission rate of a current communication session between the end device and the MEC system.

15. The network device of claim 9, wherein the processor further executes the instructions to:
identify a congestion level for each of two or more communication paths that are being used to support two or more traffic flows between the end device and the MEC system in a dual or higher connectivity communication session, and wherein, when selecting, the processor further executes the instructions to:
select the traffic control action that indicates to increase an amount of the two or more traffic flows for at least one of the two or more communication paths that has the congestion level that is less than the congestion level of another one of the two or more communication paths.

16. The network device of claim 9, wherein
the MUCI includes an identifier of an application server device of the MEC system.

17. A non-transitory, computer-readable storage medium storing instructions executable by a processor of a device, which when executed cause the device to:
receive radio access network user plane congestion information (RUCI) and multi-access edge computing user plane congestion information (MUCI);
determine whether at least one of congestion or an anticipated congestion is present in at least one of a radio access network to which the RUCI pertains or a multi-access edge computing (MEC) system to which the MUCI pertains;
determine, based on at least one of the RUCI or the MUCI, that the at least one of the congestion or the anticipated congestion is present;
select a traffic control action in response to the determination that the at least one of the congestion or the anticipated congestion is present; and
invoke the traffic control action to be carried out by at least one of a first network device of the radio access network, a second network device of the MEC system, or an end device in communication with the MEC system.

18. The non-transitory, computer-readable storage medium of claim 17, wherein the instructions to invoke further comprise instructions to:
transmit to the at least one of the first network device, the second network device, or the end device, a message that indicates to perform the traffic control action.

19. The non-transitory, computer-readable storage medium of claim 18, wherein when the message is transmitted to the end device, the traffic control action indicates to the end device to disconnect from the first network device via which a current communication session with the MEC system is supported, and search and select a third network device via which to communicate with the MEC system.

20. The non-transitory, computer-readable storage medium of claim 17, wherein the instructions further comprises instructions to:
   identify a congestion level for each of two or more communication paths that are being used to support two or more traffic flows between the end device and the MEC system in a dual or higher connectivity communication session, and wherein, the instructions to select further comprise instructions to:
select the traffic control action that indicates to increase an amount of the two or more traffic flows for at least one of the two or more communication paths that has the congestion level that is less than the congestion level of another one of the two or more communication paths.

\* \* \* \* \*